(12) United States Patent
Holmes et al.

(10) Patent No.: US 6,230,009 B1
(45) Date of Patent: *May 8, 2001

(54) METHOD AND APPARATUS FOR ALERTING A STATION IN ONE NETWORK OF A REQUESTED COMMUNICATION FROM A SECOND NETWORK

(75) Inventors: David William James Holmes, Redmond; Adrian Smith, Kirkland, both of WA (US)

(73) Assignee: AT&T Wireless Services, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,336

(22) Filed: Dec. 27, 1996

(51) Int. Cl.$^7$ ..................................... H04Q 7/20
(52) U.S. Cl. .................... 455/426; 455/552; 455/445
(58) Field of Search ................... 455/426, 466, 455/552, 553, 432, 433, 435, 561, 445; 379/93.09, 93.01, 93.06, 902, 207

(56) References Cited

U.S. PATENT DOCUMENTS

| | | | | |
|---|---|---|---|---|
| H1641 | * | 4/1997 | Sharman | 455/466 |
| 5,127,042 | * | 6/1992 | Gillig et al. | 455/564 |
| 5,313,654 | * | 5/1994 | Comroe et al. | 455/426 |
| 5,371,898 | * | 12/1994 | Grube et al. | 455/426 |
| 5,392,452 | * | 2/1995 | Davis | 455/552 |
| 5,396,539 | * | 3/1995 | Slekys et al. | 455/466 |
| 5,457,680 | * | 10/1995 | Kamm et al. | 455/466 |
| 5,465,401 | | 11/1995 | Thompson | 455/89 |
| 5,487,175 | * | 1/1996 | Bayley et al. | 455/466 |
| 5,504,803 | * | 4/1996 | Yamada et al. | 455/552 |
| 5,510,778 | | 4/1996 | Krieter | 340/825.44 |
| 5,533,019 | | 7/1996 | Jayapalau | 370/60.1 |
| 5,539,810 | | 7/1996 | Kennedy, III et al. | 379/59 |
| 5,544,222 | | 8/1996 | Robinson et al. | 379/58 |
| 5,544,225 | | 8/1996 | Kennedy, III et al. | 379/59 |
| 5,546,444 | * | 8/1996 | Roach, Jr. et al. | 455/466 |
| 5,555,553 | * | 9/1996 | Jonsson | 379/207 |
| 5,726,984 | * | 3/1998 | Kubler et al. | 455/412 |
| 5,737,706 | * | 4/1998 | Seazholt et al. | 455/456 |
| 5,742,905 | * | 4/1998 | Pepe et al. | 455/461 |
| 5,797,099 | * | 8/1998 | Ejzak et al. | 455/422 |
| 5,802,456 | * | 9/1998 | Hulsebosch | 455/466 |
| 5,805,997 | * | 9/1998 | Farris | 455/466 |

FOREIGN PATENT DOCUMENTS

WO 95 26113  9/1995  (WO).
WO 97 26764  7/1997  (WO).

* cited by examiner

Primary Examiner—William G. Trost
Assistant Examiner—Jean A Gelin

(57) ABSTRACT

A mobile station can be selectively coupled to two or more networks. By maintaining an address translation table and introducing communication between the switching control units within the multiple networks, it is possible to provide notification to the mobile station of the existence of a communication request from a first network while the mobile station coupled to the second network.

17 Claims, 2 Drawing Sheets

FIG. 1
(PRIOR ART)
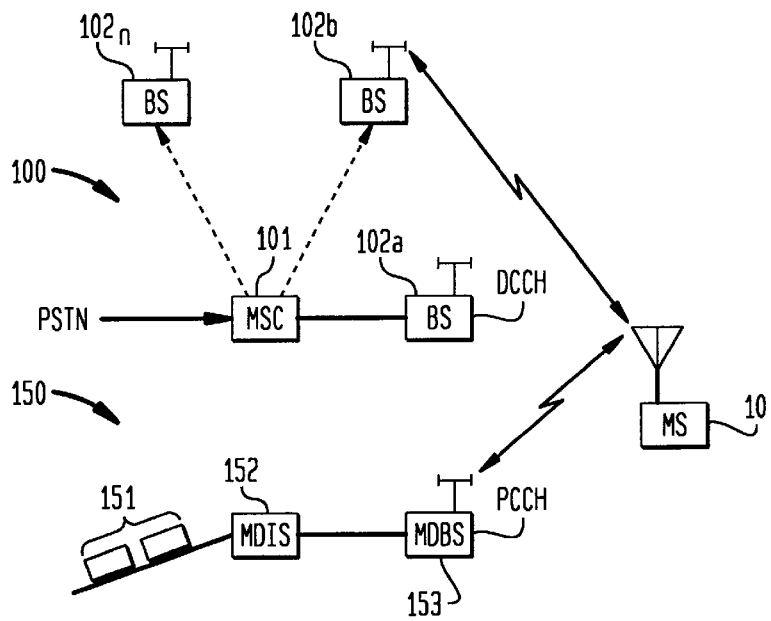
FIG. 2
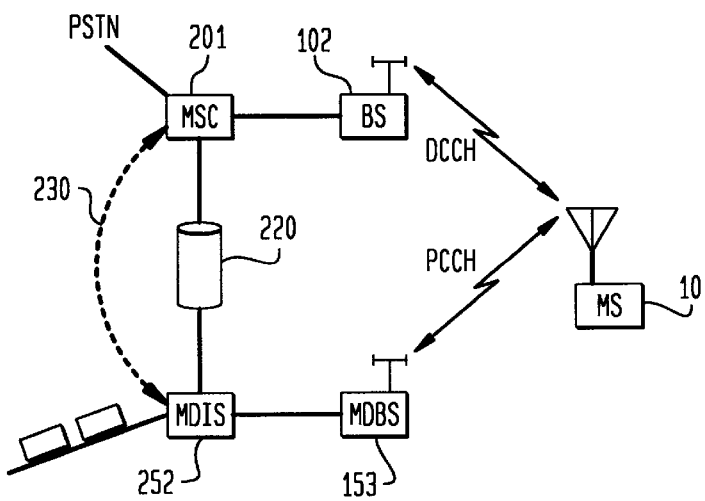
FIG. 3
| MIN | IP ADDRESS |
|---|---|
| XXX XXXX | YYY.YYY.YY.YY. |
| | |
| | |

METHOD AND APPARATUS FOR ALERTING A STATION IN ONE NETWORK OF A REQUESTED COMMUNICATION FROM A SECOND NETWORK

The present application is directed to a method and system for alerting a mobile station coupled to a first network that a communication request for the station appears on a second network. More particularly, the present invention is directed to a method and system for tracking which network a mobile station is coupled to and then translating address information to communicate alert messages to the mobile station with regard to communications on yet another network.

It is known in the field of wireless communications to provide mobile terminal devices in accordance with a standard referred to as IS-136. In accordance with that standard the mobile terminal can have the capability of conducting communication on at least two different networks. One network is the standard wireless voice network while the other network is a packet data network commonly referred to as CDPD (Cellular Digital Packet Data).

An example of a known communication configuration is illustrated in FIG. 1. The mobile station 10 is capable of communicating over either one of two networks, a voice network 100 and a packet network 150. In voice network 100 the mobile station 10 can communicate with any one of a plurality of base stations (102a to 102n) depending on the cell in which the mobile station is located. The base stations are coupled to a mobile switching center (MSC) 101 which controls the switching for the wireless communications. The MSC 101 can be coupled to the public switch telephone network (PSTN). Typically, when the user of the mobile station turns on the station it will automatically register with the MSC 101 through the base station serving the cell in which the mobile station is located. The mobile station performs this registration through a digital control channel (DCCH) associated with the base station.

A mobile station 10 is also capable of packet data communication. These communications are handled via packet network 150. Packets symbolically represented as elements 151 are received by a mobile data intermediate system or mobile gateway (MDIS) 152 which in essence is a packet data counterpart to the MSC 101. The MDIS 152 can communicate with a plurality of mobile data base stations such as MDBS 153 which can send wireless transmissions to the mobile station 10 when that station is in the cell served by the MDBS. When the mobile station wishes to register for purposes of engaging in packet data communications, it does so over a packet control channel (PCCH) associated with the MDBS 153.

Presently, because of the different architecture of these two networks, the voice network and the packet network, there is a lack of commonality of interfaces. As a consequence, while the mobile station 10, is "camped on" to the control channel for one of the two networks, (i.e., while it is set to communicate control information to or receive information from a base station relating to one of the control channels), it cannot receive any information from the other network. For example, if mobile station 10 is camped on to a DCCH, then any attempt at providing a packet data transmission or communication to mobile station 10 in the known network configuration, is impossible. There is no way to signal the mobile station 10 over the PCCH since the mobile station is locked onto or camped onto the DCCH. Similarly, should the mobile station be camped onto the packet network, PCCH in anticipation of packet data communication, it is unable to receive any notice of a communication via the voice network.

It is desirable to provide a system in which the mobile station, while active and camped on in one network, can receive notices of communications on another network with which it is capable of communicating.

SUMMARY OF THE INVENTION

In accordance with the present invention, the mobile switching center of the voice network and the MDIS of the packet data network can be in communication with one another either indirectly via a memory or directly. The indirect or direct communications operate to provide mobile station address information from the network on which the mobile station is camped to the alternative network. Then, alternative network, upon receipt of a communication request for the mobile station, can generate a request to the mobile station through the network on which it is camped to advise the mobile station of the existence of an attempted communication on the alternative network. This alert or notice can be generated directly by the alternative network which could use an address translator to identify the address of the mobile station on the network on which it is camped and can create a message of appropriate structure for the network in which the mobile station is camped.

Alternatively, the network receiving the communication request could send a communication request trigger to the network to which the mobile station is camped and that latter network could generate the appropriate address and message alert for the mobile station.

The present invention permits the mobile station to receive notice of communication requests from the network or networks with which it has registered but on which it is not camped (that is, to which it has identified itself while its in the region of interest).

SUMMARY OF THE DRAWINGS

FIG. 1 illustrates a known network configuration of a voice network and a data network with which a mobile station can communicate.

FIG. 2 illustrates a first embodiment of the present invention.

FIG. 3 illustrates an address translation table useful in connection with the embodiment of FIG. 2.

DETAILED DESCRIPTION

Figure 4:
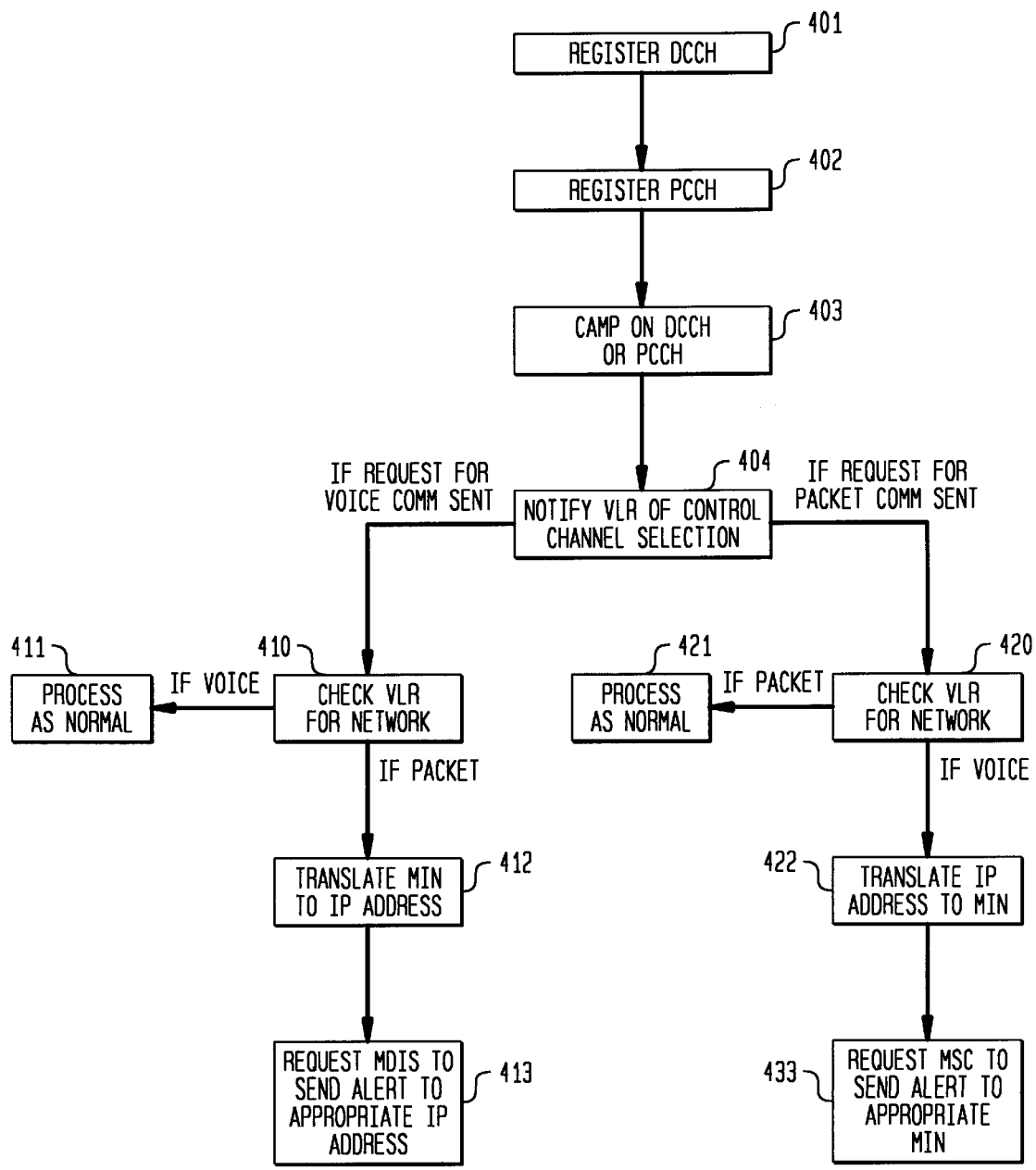
FIG. 4 illustrates a process flow in connection with an implementation of an embodiment of the present invention.

FIG. 2 illustrates an embodiment of the present invention. The base station 102, the mobile database station 153 and the mobile station 10 correspond to the same elements that appear in FIG. 1. In accordance with the embodiment of FIG. 2, the mobile switching center 201 and the mobile data intermediate station or gateway 252 are both coupled to a database 220. The two elements are also coupled to one another.

It is known at present that in actual installation, the MSC and MDIS may be in the same rack of equipment. In accordance with the present invention these two elements would now, for the first time, be coupled to one another so as to be able to communicate requests for data transmission through one another to enhance the ability of the mobile station to be notified of pending communication requests. The database 220 could store an address translation table, an example of which is shown in FIG. 3. That translation table would correlate a mobile identification number (MIN) of the mobile station with the IP (Internet protocol) Address associated with the mobile station. The embodiment illustrated in FIG. 2 could operate in accordance with the process set forth in FIG. 4.

In accordance with a known registration procedure, once the mobile station is turned on, it will register with the DCCH of the cell in which it is located. After registering with the DCCH, the mobile station will then register with the PCCH in step 402. Then, depending on the user's preference for communications, the mobile station will camp onto either the DCCH or the PCCH as indicated in step 403. After camping on, the visitor location register (VLR) for that cell would be notified of the control channel selection of the mobile station in step 404. As a consequence, the VLR would store, for example as a flag, information identifying that network on which the mobile station is camped on.

If a request for a voice communication is sent, then the voice communication request arrives to MSC 201 which checks the VLR for which network the mobile station is camped, step 410. If the mobile station is camped on the DCCH, then the MSC will process the voice communication as normal, step 411. If, however, the MSC determines upon inspection of the VLR that the mobile station is camped on the PCCH in the packet network the processing differs. The MSC can then translate the MIN of the mobile station to an IP address by accessing the address translation table stored in database 220, step 412. Subsequently, the MSC sends a request to the MDIS to send an alert to the appropriate IP address for the MS 10, step 413. In one possible embodiment, the MSC merely sends a trigger along with the IP address and the MDIS creates a packet data signal for transmission to MS 10 over the PCCH. Alternatively, the MSC 201 could take the IP address data and construct its own packet message, thereby replicating a packet data communication request and transmit that request to the MDIS which would then act merely as a pass through device.

Once the mobile station receives the notice of the communication request from the voice network, the mobile station can elect to camp on the DCCH or to not respond to the communication request and remain camped on the PCCH.

An analogous operation is performed at the MDIS when a request for packet communication is received. The MDIS can check the VLR for determination of the network to which the MS is camped on. If MS 10 is camped on the PCCH then MDIS 252 processes the request for packet communication in a normal fashion. If, however, mobile station 10 is camped on the DCCH, then MDIS 252 can access the database 220 to translate the IP address to a MIN, step 422. The MDIS then requests the MSC 201 to send an alert to the appropriate MIN, step 433. As described above, the MDIS could simply transmit a trigger to MSC 201 which would then initiate signaling, via the DCCH, to notify mobile station 10. Alternatively, MDIS 252 could attempt to replicate a voice communication request such as those which arrive from the PSTN using the appropriate MIN.

In accordance with the present invention, the voice network and the packet data network communicate with one another in such a manner that they can notify the mobile station 10 that a communication awaits it on a network to which it is not camped on.

In the embodiment described with respect to FIG. 4, it is described that the mobile station first registers with DCCH and then with PCCH. The order of registration could be reversed.

Furthermore, in the embodiment illustrated in FIG. 2, a separate database is accessible by both the MSC and the MDIS. Other alternatives exist. For instance, the database could be either the MSC or MDIS and not directly connected to the counterpart in the other network. Or, alternatively, MSC and MDIS could each maintain its own address translation table. In such a circumstance then, the MSC and MDIS would have to communicate with one another during the registration process so as to advise one another of the appropriate network addresses for the mobile station to guarantee that they would be properly correlated with one another.

Additionally, the present invention has been described in the context of voice/packet data networks. It has equal applicability to any multimode station capable of communicating with distinct networks in its different operational modes, such as voice and paging networks for example. Thus, in accordance with the present invention, a mobile station which is capable of communicating with multiple networks such as a voice network and a packet data network, can receive notification of the existence of a communication request from one of the networks while the mobile station is camped onto one of the other networks.

What is claimed is:

1. In a communication system comprising a first over the air network and a second over the air network wherein a mobile station is capable of being coupled to either one of the first and second networks, a method for notifying the mobile station of a communication on one of the first and second a networks to which the station is not presently coupled, the method comprising the steps of:

storing an address and a registration identifier for the mobile station camped on one of said first and second over the air networks;

receiving a communication request from that one of said first and second over the air networks to which the mobile station is not presently coupled;

using the stored address of the mobile station camped on one of said first and second over the air networks to send an alert via that one of said first and second over the air networks to which the mobile station is presently coupled that said communication request has been received;

wherein said alert informs the mobile station that said communication request is available on said one of said first and second over the air networks to which the mobile station is not presently coupled, wherein said registration identifier indicates which of said over the air networks said mobile station is presently camped on.

2. The method of claim 1 wherein said step of storing comprises the steps of:

detecting when the mobile station changes its camp-on status between the first and second over the air networks; and updating a memory with an address of the mobile station in the network on which it is camped.

3. The method of claim 1 wherein said first network is a voice network and said second network is a paging network.

4. The method of claim 1 wherein said first network is a voice network and said second network is a data network.

5. The method of claim 4 wherein;

the mobile station is initially camped on to said first network;

said step of storing occurs after the mobile station camps on to the second network; and said step of receiving receives a communication request from said first network.

6. The method of claim 4 wherein the step of receiving receives a communication request from said second network.

7. The method of claim 4 wherein;
the mobile station is initially camps on to said second network;
said step of storing occurs after the mobile station camps on to said first network; and
said step of receiving receives a communication request from said first network.

8. The method of claim 4 wherein said data network is a packet data network.

9. The method of claim 4 wherein said first network is a voice network and said second network is a paging network.

10. The method of claim 1 wherein said alert includes information regarding said received communication request.

11. The method of claim 10 wherein said information includes how the mobile station should connect to the communication.

12. In a wireless communication system comprising a wireless voice network and a wireless data network, wherein a mobile station can camp onto the voice network via a first control channel and can camp onto the data network via a second control channel but cannot camp on both networks simultaneously, a method for notifying the mobile station of a communication from the voice network while it is camped on the data network, the method comprising the steps of:
storing an address for the mobile station as it is camped on the wireless data network;
receiving a communication request for the mobile station from the wireless voice network;
using the stored address of the mobile station to send an alert via said wireless data network that said communication request has been received on the wireless voice network;
wherein said alert informs the mobile station that said communication request is available on said wireless voice network,
wherein said mobile station is initially camped on either said wireless voice network or said wireless data network.

13. In a wireless communication system comprising a wireless voice network and a wireless data network, wherein a mobile station can camp onto the wireless voice network via a first control channel and can camp onto the wireless data network via a second control channel but cannot camp on both networks simultaneously, a method for notifying the mobile station of a communication from the wireless data network while it is camped on the wireless voice network, the method comprising the steps of:
storing an address for the mobile station as it is camped on the wireless voice network;
receiving a communication request for the mobile station from the wireless data network;
using the stored address of the mobile station to send an alert via said wireless voice network that said communication request has been received;
wherein said alert informs the mobile station that said communication request is available on said wireless data network,
wherein said mobile station is initially camped on either said wireless voice network or said wireless data network.

14. A communication system for permitting communication requests to follow a mobile station that can only be coupled to one network at a time after it changes networks, the system comprising:
memory storing an address and a registration identifier of a mobile station on a network to which it is coupled;
a communication receiver that receives a communications request on a network to which the mobile station is not coupled;
a processor, coupled to said memory and said communication receiver and using said address and said registration identifier of the mobile station to alert the mobile station via said network to which it is coupled that said communication request was received; and
receiving an indication that said mobile station has changed network status to camp on to the network associated with the communication request,
wherein said registration identifier indicates which of said networks said mobile station is presently camped on.

15. The system of claim 14 wherein the mobile station is coupled to a wireless voice network and then changes to a wireless data network, said communication request being received by said voice network.

16. The system of claim 14 wherein the mobile station is coupled to a data network and then changes to a voice network, said communication request being received by said data network.

17. In a wireless communication system, a method for enabling a single mobile station to communicate via multiple wireless networks when said single mobile station is limited to connecting to one network at a time, the method comprising the steps of:
registering the mobile station with a first wireless network over a control channel associated with said first wireless network;
storing in a memory, an address of the mobile station on the first wireless network;
registering the mobile station with a second wireless network over a second control channel associated with said second wireless network;
storing in the memory an address of the mobile station on the second wireless network;
associating the mobile station's stored addresses with one another in the memory;
storing in the memory a registration identifier indicating which of said wireless networks said mobile station is presently camped on;
receiving a request that a connection with the mobile station be established over the first wireless network;
determining whether the mobile station is camped on to said first wireless network using said registration identifier;
if the mobile station is camped on to said first wireless network then establishing a connection with the mobile station over the first wireless network; and
if the mobile station is not camped on to said first wireless network then,
forwarding an alert to the mobile station via the second wireless network using said stored address of the mobile station on the second wireless network,
receiving an indicator that the mobile station has camped on to said first wireless network, and
establishing a connection with the mobile station over the first wireless network after the mobile station camps on to said first wireless network.

* * * * *